Aug. 6, 1940.  C. A. HAWKINS  2,210,485
VEHICLE
Filed Dec. 5, 1938  3 Sheets-Sheet 1

INVENTOR
Charles A. Hawkins

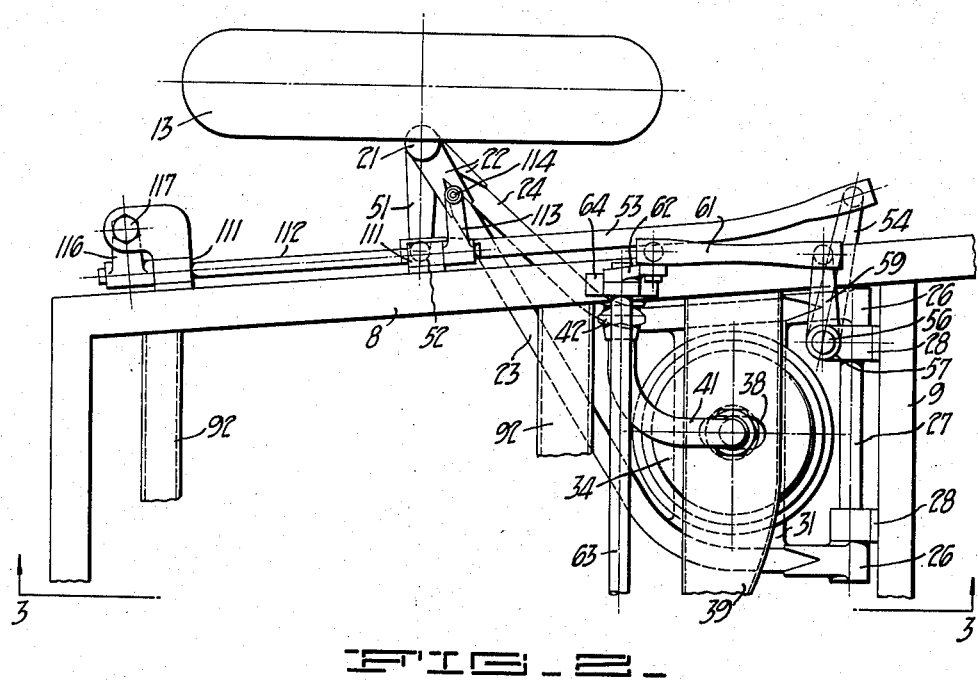
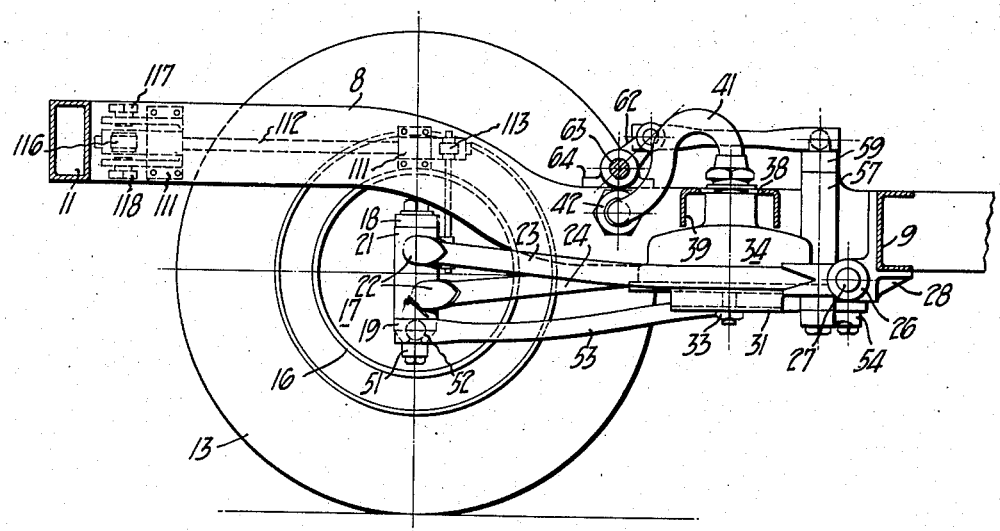

Patented Aug. 6, 1940

2,210,485

UNITED STATES PATENT OFFICE 2,210,485

VEHICLE

Charles A. Hawkins, Fresno, Calif.

Application December 5, 1938, Serial No. 244,008

11 Claims. (Cl. 280—104)

My invention relates to vehicles of the type disclosed in my Patent No. 1,721,732, issued July 23, 1929, in my Patent No. 2,023,135, issued December 3, 1935, and in Hawkins et al. Patent No. 1,905,865, issued April 25, 1933, and is particularly concerned with improvements to vehicles of this general type.

While the vehicle of my present invention is by no means confined to use only with passengers or for relatively light loads, it is conveniently described in connection therewith, and the problems involved in carrying a varying number of passengers are substantially similar in kind to, although varying in amount from, the problems involved in carrying lading in different weights and quantities. The sprung weight of a vehicle is ordinarily fixed except for minor variations in fuel load and the like, yet the pay load carried, whether lading or passengers, varies from time to time. Particularly from the standpoint of passenger comfort in passenger vehicles, but also from the standpoint of wear and tear on the structure and on the highway not only in passenger vehicles but also in freight vehicles, it is desirable to have the maximum comfort or the lowest periodicity of body movement, as well as a minimum of sprung weight movements in relation to wheel movements, despite variations in road conditions.

With very light vehicles, which are of course most economical to manufacture and maintain, it can be assumed that the vehicle weight is 1000 lbs., of which the sprung weight is 700 lbs., and that the passenger capacity is from one to five passengers so that the passenger weight varies between, say, 150 lbs. and 750 lbs. When the least number of passengers is carried, the load is one-fifth the vehicle sprung weight, whereas when the maximum number of passengers is carried, the pay load exceeds the sprung weight. The same example suffices for freight vehicles, except that perhaps in many instances the vehicle pay load will double the total vehicle weight itself. One of the chief problems, therefore, is to devise some means of insuring substantially a maximum of passenger comfort, that is, freedom from jolts and bumps despite the character of terrain traversed and despite variations in vehicle loading.

A second problem is concerned with the minimizing of other forces on the vehicle in addition to those imposed by roughness of the road, as for example, transverse wheel oscillations at speed and the gyroscopic resistance resulting from wheels being thrown out of their spinning orbit, transverse axle movements against resistance of the springs carrying the body weight, and transverse movements of the sprung weight, as well as unnecessary vertical movement of the sprung weight. A large number of the jolts and bumps which are imparted to the passengers or lading are derived directly from unevenness in the terrain traversed, but another large number arises out of the driving forces imposed upon the vehicle by the power plant and the power transmission mechanism, and another group of forces is imposed to disturb the passengers and lading by applications of the braking forces to the vehicle, which in most instances at the maximum exceed the driving forces, resulting in movements of the steered wheels that must be compensated for by constant steering wheel manipulation by the driver, causing excessive fatigue and resulting in accidents. Another group of disturbing forces results from side sway or tipping of the sprung load when the vehicle runs on a banked road or varies from a straight line of travel, particularly on rough roads when the vertical movement of the steered wheels causes lengthening and shortening of the transverse steering link.

It is therefore desirable to provide ways of driving the vehicle and of braking the vehicle so that the forces incident thereto produce as little as possible disturbance to the passengers or freight and minimize unnecessary motions of various parts of the vehicle itself as well as the violence of all motions at a given speed on a given road. And especially is it desirable to produce a condition in which the disturbing forces due to driving and braking are minimized whether or not the load on the vehicle is a minimum, a maximum, or any variable amount therebetween.

To a somewhat lesser degree in most instances, but nevertheless of sufficient magnitude to be important, are the forces imposed on a vehicle by the steering structure, which can be applied to the vehicle in such a way as also to produce side swaying of the sprung load, discomfort of the passengers or unwarranted and destructive dislodgement of the load in the case of a freight vehicle. These forces may depend on the speed, the radius of the turn and the center of gravity, which cause the vehicle to turn over or sway so violently that the driver loses control of it. One of the problems, therefore, is to provide a steering structure and supporting connections between the wheel and the frame, in which the steering forces are introduced into the vehicle in such a way as to produce as little disturbance as possible to the sprung weight carried.

It is one object of my invention to provide an economically feasible light vehicle in which the variously described and incidental disturbing forces are dealt with in ways to produce the least possible disturbing effect upon the vehicle occupants or the vehicle loading, one with a low periodicity, a low percentage of compounding spring resistance to ordinary wheel movement, yet with adequate means for caring for changes in sprung weight without materially changing the riding qualities, side sway or roadability.

Another object of my invention is in general to improve motor vehicles by a design, that should run at speed with no feeling of motion by the passenger except the passing landscape, and have a minimum of noise, power waste, first cost, fuel consumption and upkeep.

A further object of my invention is to provide a motor vehicle which is designed especially for use with variable loads and occupancy.

A further object of my invention is to provide a motor vehicle in which the disturbing forces due to road irregularities, due to power application, due to brake application and due to steering are dealt with in a way so that they are rendered not unpleasant to passengers and not unduly disturbing to lading on a freight vehicle.

Another object of my invention is to provide a motor vehicle with better riding qualities resulting from design rather than increased sprung weight.

The foregoing and other objects are attained in the embodiment of the invention illustrated in the drawings, in which Fig. 1 is a plan of a chassis of a motor vehicle constructed in accordance with my invention;

Fig. 2 is an enlarged plan of the forward corner of the vehicle, showing in greater detail the arrangement of the supporting and steering structure;

Fig. 3 is a cross-section the plane of which is indicated by the line 3—3 of Fig. 2;

Figure 1:
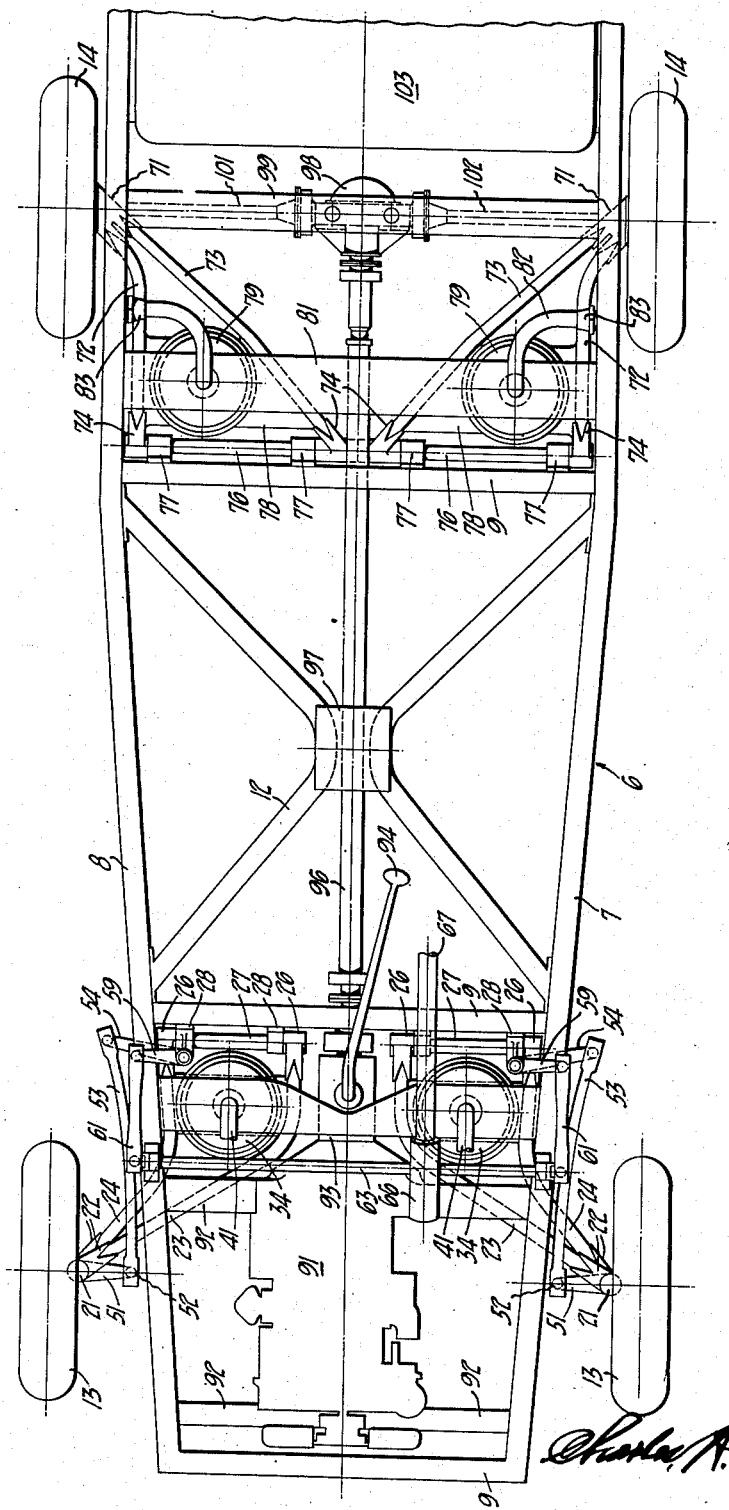

In its preferred form, the vehicle of my invention includes a plurality of ground-engaging supporting wheels each of which is individually related to the vehicle frame by a transversely journaled wheel arm and a pneumatic supporting structure, all of the supporting structures being preferably, although not necessarily, pneumatically interrelated and interconnected through the medium of the vehicle frame which acts as an air storage reservoir and conduit between the air bottles, the pneumatic supporting devices being so located with respect to the frame and the distribution of weight that the vehicle has a relatively low periodicity of movement, and being so located with respect to the center of gravity of the vehicle that the steering forces and the braking forces and the road irregularity forces are imposed in a way substantially not to produce pitching, tipping, swaying or vertical movement of the frame. There is also provided a steering arrangement in which each of the steering wheels is appropriately connected so that there is no discrepancy in their movement to introduce extraneous disturbing forces into the vehicle. There is also provided a means of connecting the wheels to the frame that prevents side sway or tipping of the sprung weight on the unsprung parts of the vehicle.

While the vehicle of my invention can be made in a wide range of sizes and weights and for various purposes, such as for carrying passengers or for carrying freight, it is exemplified herein in a chassis which is designed especially for passenger work and is particularly designed to be exceedingly light in weight. The chassis 6 includes a plurality of structural members, particularly a left-hand side rail 7 and a right-hand side rail 8 extending longitudinally of the vehicle and connected at intervals by suitable cross-members 9. The side rails 7 and 8 and the cross-rails 9 are all preferably fabricated to achieve in cross-section a hollow box, as indicated at 11 in Fig. 3, so that the hollow box is air-tight yet has an internal volume utilized in connection with the suspension system. In addition to the parts of the frame which are pneumatically enclosed and are connected together to form a reservoir and conduit, there are parts such as an X-member 12 which may or may not be included in the reservoir system and in the present instance includes structural channels having no interior volume and which act simply as transverse and longitudinal bracings. The frame 6 is supported on the ground through the agency of a plurality of ground-engaging wheels divided into a front pair 13 and a rear pair 14.

Figure 4:
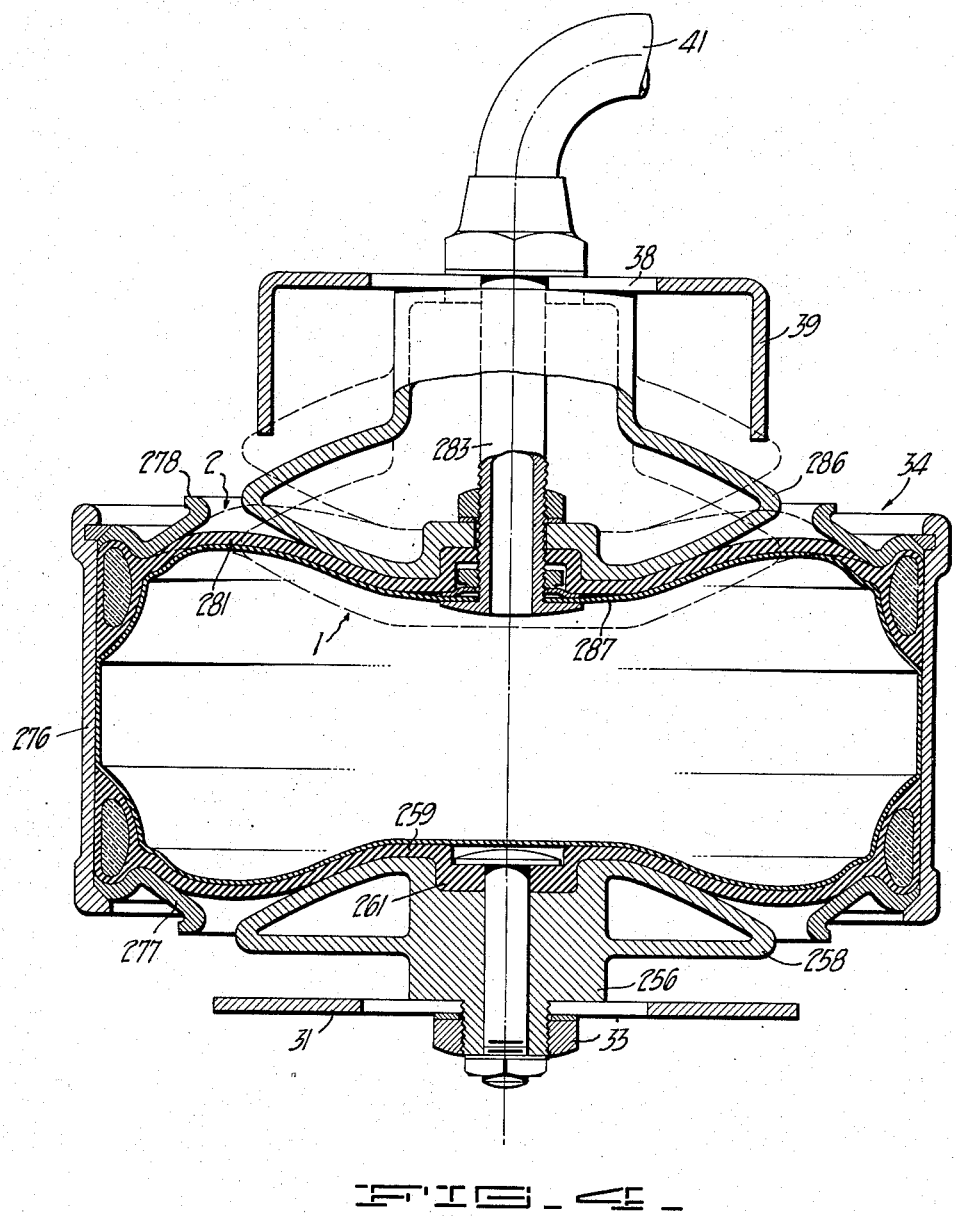
Fig. 4 is a cross-section of a pneumatic device.

Each of the wheels is independently connected to the chassis by a structure 23 which is substantially identical with that of the other wheels except for a reversal in symmetry, so that a description of one will suffice. These are so shaped that they are transversely journaled both to the frame and to the wheels so the frame will not tip or sway sidewise on the wheels, and are each spread near the frame into two sections between which pneumatic devices are mounted to obtain a low center of gravity for the sprung weight. I provide bearings wide apart to connect with the frame and strong light construction against side thrust and weight carrying. These wheel arms on the vehicle shown as an example are each 21" long between the center of the wheel and the center of the frame connecting bearings in a longitudinal direction. The pneumatic devices or air springs are mounted 16" from the wheel center end and 6" from the frame journal bearing end of the wheel arm. The load on each wheel end is approximately 500 lbs., carried through the pneumatic device to the frame at a leverage of about three and one-half to one. It will be seen, therefore, assuming a five-passenger pay load, which is equal to 750 lbs., and air pressure sufficient to give a perfect ride so loaded, that there will be a total of 6600 lbs. on all four pneumatic devices. Then, if the number of passengers is reduced to one, thereby reducing the weight by 600 lbs., the pressure reduction on the pneumatic devices is reduced and the result will be that the diaphragms in the pneumatic devices which, with full load of five passengers, operate in position No. 1 as shown in Fig. 4 with full contact with all of the surface of the followers 286 and 258 and no contact with the rings 277 and 278, will, with the latter load of one passenger, have expanded outward to position No. 2 as shown in Fig. 4. There is then full contact against rings 277 and 278 in Fig. 4 and a smaller surface contact with the followers 286 and 258, reducing the effective lifting area against the frame in square inches equal to the reduced pressure on the pneumatic devices by the reduced spring load, so that the riding qualities will be the same with one passenger with the smaller effective diaphragm areas, as it was with five passengers on the larger effective diagram areas. When the diameter of the diaphragms and the shape and width of the rings 277 and 278 and of the followers 258 and 286 are properly proportioned for the weight of the vehicle and expected load variations, the diaphragms will pull away from the surface of the rings 277 and 278 and increase contact surface with the followers 258 and 286, so that the increased resistance or decreased resistance will approximately equal the changes in sprung weight at maximum load or minimum load and all loads between, giving equally good riding at all loads without adding to or exhausting air from the frame reservoir and the pneumatic devices. Of course, the added air pressure, when the diaphragms are compressed closer together by putting more load upon them, must be considered in making the design, as that consideration contributes to constant riding qualities at varying loads but with a large volume of air holding space is not alone sufficient.

Each of the wheels 13 and 14 is provided with a brake drum 16, a brake shoe and a backing plate connected to the wheel arm 23. On the front wheels 13 the backing plates 17 are united with a steering knuckle having an upper part 18 and a lower part 19. Between the parts 18 and 19 is located a steering boss 21 having sockets 22 projecting therefrom and into which are welded a pair of support arms 23 and 24 which extend inwardly and rearwardly of the frame, finally turning substantially parallel to each other and terminating in hub fittings 26 mounted on a transverse shaft 27 pivotally supported in brackets 28 secured to the cross-member 9 adjacent thereto. By this construction vertical movement of the wheels 13 takes place in an arc about the axis of the shaft 27 as a center. The relative location of the shaft 27 with respect to the wheel 13 is such as to absorb, without undue stress on any part, the side thrust which is imposed upon the wheel 13 from time to time, and the fore-and-aft position of the center of the pneumatic device on cross member 39 with respect to the axis of the wheel 13 is such that the pivotal axis is adjacent the center of gravity of the vehicle, so that the forward cross-member 9 of the frame is disposed substantially as far forward of the cross member 39 as the center of gravity of the vehicle is to the rear of such member.

Considered from the standpoint of its supporting point on the front wheels only, therefore, the vehicle frame has a very long front overhang beyond the point of support on the wheels, so that the periodicity of movement of the vehicle under disturbing forces is relatively slow. This is likewise so at the rear, and when the free air flow between the supporting pneumatic devices through the frame is considered, it will be seen that a new result is obtained somewhat resembling that of the old Concord stage coach construction where the body was hung on leather straps allowing slow, easy fore and aft-motion, modifying the violence of the wheel movements on rough roads. This can also be appreciated by analogy in considering the short, quick, almost choppy movement of a short pendulum as contrasted with the slow and deliberate movement of a long pendulum under the influence of the same disturbing force.

In order to transmit loads between the ground-engaging wheels 13 and the frame 6, I preferably provide a pneumatic supporting system. For this reason I span the space between the members 23 and 24 with a pressed metal saddle 31 having adjacent its center a longitudinally extending slot through which extends the fastening means 33 of the movable member of a pneumatic support, generally designated 34. Various types of support of this nature are shown in my mentioned patents. Suffice it to say that a typical one is illustrated in Fig. 4, which shows a lower member 258, referred to as a follower, which is connected by a fastening 256 in a slot in the saddle and bears against a flexible rubber and fabric diaphragm 259 having a central boss 261 which positions it. The diaphragm is secured against an outer band 276 by a confining ring 277. Also abutting the band 276 is an upper diaphragm 281 of comparable construction, retained in place by a ring 278 and secured to a follower 286 by a fastening stem 283 which is connected to the air system. Within the space enclosed by the diaphragms is an inner tube 287 for confining the air. Relative approaching movement of the followers 258 and 286 causes them to come almost entirely into contact with the diaphragms and to lift the diaphragms from the rings 277 and 278, so that separating movement of the followers causes the diaphragms to lie against the rings 277 and 278 and to pull away from the followers 258 and 286. With this arrangement, upon upward and downward movement of the vehicle wheels with respect to the vehicle frame, the volume of the chamber enclosed by the tube 287 is varied by flexing of the diaphragms, so that air flow into and out of the pneumatic device is effected and so that air pressure is varied. The area on which the lifting force is effective of the followers 258 and 286 varies by increasing or decreasing the contact area with the diaphragms 259 and 281 and by varying the area between the diaphragms 259 and 281 and the rings 277 and 278.

In the present instance the follower 286 is fastened in a longitudinally extending slot 38 in a beam or cross member 39 comprising an inverted channel extending transversely of the vehicle between the side members 7 and 8. The air flow from the interior of the pneumatic device is conducted through a flexible hose 41 into a fitting 42 joining the hose to the interior volume of the frame members. In practice I preferably make this interior volume substantially forty times the volume of the normal operating change of volume resulting from a 2-inch movement of one wheel when all other wheels remain level. Of course, if some other wheel drops away 2 inches at the same time, no change in the cubic content of the pneumatic devices and frame takes place, as only interflow of air results and no frame movement or impact from the wheel movements occurs. The rise in pressure in each device due to wheel deflection is not a major factor in varying the total air pressure, enabling me to obtain as little or as much compounding of pressure springing resulting from wheel movement as desired. By compounding I refer to the increasing resistance to movement of the pneumatic devices with increasing deflection due to stressing the fabric of the diaphragms, due to varying contact areas between the followers and the rings, and due to various other factors which appear herein. Furthermore, since all the pneumatic devices are connected into a common reservoir, there is an intercommunication of air between them, thereby equalizing the pressure on each wheel on rough road and reducing impacts and vehicle frame motion in relation to the wheel vertical movements.

In accordance with my invention I provide means for steering the front pair of wheels 13, and to that end from each of the lower members 19 of the dirigible wheel assembly I extend a steering arm 51 which terminates in a ball 52 engaged by the forward end of a drag link 53 extending rearwardly in substantial parallelism with the frame side member and at its rearward extremity having a ball connection with an arm 54 which projects from the lower end of a vertical shaft 56 pivotally mounted in a forward extension 57 of one of the brackets 28 secured to the cross-member 9. The upper end of the shaft 56 carries a steering arm 59 which is joined by a ball connection to a tie rod 61 extending forwardly and at its front end being provided with a ball connection to an upstanding arm 62 at one extremity of a steering shaft 63 spanning the vehicle and journaled in brackets 64 secured to the side rails 7 and 8 thereof. The steering shaft 63 is rotated by a steering mechanism 66, preferably of the worm type, which is operated through a steering column 67 by a steering wheel of the conventional kind (not shown). The symmetry of the supporting mechanism is continued in the steering mechanism, so that the linkage just described for one of the steering wheels is duplicated symmetrically for the other steering wheel (see Patent No. 1,846,553 by my engineer, H. L. Hirschler, assigned to me).

But in addition to freedom from error by the provision of a separate steering structure for each wheel, there is an interrelation between the supporting arm and the steering mechanism in that the ball connection at the end of the steering link 53, when the vehicle is going straight ahead, is substantially in line with the axis of the supporting shaft 27, and the ball at the other end of the steering link 53 is in line with the dirigible wheel center, so that rising and falling movement of the wheels does not in any wise produce any effect upon or movement of the dirigible wheels' direction of travel.

The pair of wheels 14 to the rear of the vehicle are connected thereto by a similar mounting structure for each wheel, the only variation being in symmetry. To the brake plate of a wheel 14 is secured a fitting 71 having a pair of sockets into which a supporting arm tube 72 and a supporting arm tube 73 are secured, the tubes extending forwardly to a comparable pair of sockets 74 each of which is secured to a cross-shaft 76 extending substantially half-way across the vehicle and being pivotally mounted in a pair of brackets 77 secured to the adjacent cross-member 9. As is the case with the front wheels, the center of the pneumatic device at the point of its connection to the frame supporting arm is substantially half-way between the center of gravity of the vehicle and the rear end of the frame, so that there is a relatively long overhang of the frame and sprung weight with respect to the point of connection that supports the weight of the frame on the wheels. The pneumatic device supports are through the frame air conduit interconnected, balancing the sprung weight at the center of gravity, thereby making a very slow period of movement under the influence of disturbing forces, which is modified by the pneumatic device construction and the spring rod 112, plus the possible modifying effect of moderate brake application.

In order to equalize varying loads at each end of the frame, the tubes 72 and 73 are spanned by a pressed metal saddle 78 having a longitudinally extending slot therein to which is secured a pneumatic supporting device 79 in all respects comparable to that described in connection with the front wheels. Each of the supporting devices at its upper portion is fastened in a longitudinally extending slot in the cross-member 81 spanning the side rails 7 and 8 of the vehicle, and is provided with a hose 82 connecting its interior to the interior of the frame reservoir by a fitting 83. The rearmost pair of supporting devices, therefore, is connected to the same reservoir as the forward pair of supporting devices, so that an equalization of pressure occurs therebetween. If the car is a roadster carrying only two passengers and the body is light at the rear, the rear pneumatic device center upon which the frame rests is moved closed to the transverse shaft upon which the wheel arms are connected to the frame, and the front pneumatic device is moved farther away from the transverse shaft journal. In case the heavier load is carried at the rear, the movement of the pneumatic devices on the wheel arms is reversed. I can obtain any faster periodicity desired by the amount of compounding of the pneumatic device resistance and by use of the various other compounding means described to restore the frame to normal position when tipped therefrom. By the use of the usual type of shock absorber (not shown) excessive wheel bounce is thereby prevented. Large changes in sprung weight can also be equalized by increasing or decreasing the air pressure carried, as is done with tires.

In order to propel the vehicle, I provide an engine 91 of the conventional kind, preferably mounted on supports 92 in the forward portion of the frame, so that the weight of the engine at the forward portion of the frame is comparable to the massed weight at the end of a pendulum to reduce the period of movement of the frame about its central transverse axis of oscillation. From the engine 91 power is transmitted through a change-speed transmission 93 under the control of a hand lever 94 to a drive shaft 96 which customarily rotates in one direction during forward movement of the vehicle and passes through a muff 97 joining the X-members 12, and enters a differential structure 98 the gearing of which is enclosed in a housing secured on a cross-member 99 forming part of and incorporated with the main frame 6; so that the reactive forces of the differential which are often transmitted through the rear axle directly to the ground wheels are in the present instance transmitted to the frame and are opposed, so far as longitudinal and transverse torque reaction is concerned, by the torque reaction of the driving engine 91, through the frame, thereby relieving differences in pressure upon the ground by the various ground driving wheels.

From the differential mechanism transverse driveshafts 101 and 102 extend outwardly through the supporting brackets 71 by the use of two universal joints and a slip joint to the rearmost wheels 14. Preferably, fuel for the engine 91 is carried in a tank 103 located to the rear of the differential mechanism 98 substantially at the terminus of the main frame and acting in the rearward portion of the frame very much as a concentrated pendulum weight does to reduce the periodicity of the rearward half of the frame about the generally central transverse axis of oscillation. By concentrating as much as possible of the vehicle weight in the forward half of the structure substantially at the front end of the frame, by concentrating as much as possible of the weight of the rear part of the vehicle at the rearward portion of the frame, and by then supporting the frame as close as is feasible to its center, there is provided a structure which is somewhat analogous to the horizontal balancing pole with a weight at each end utilized by a tight wire performer. Such a pole in total weight is sufficiently light that the performer can maneuver it, yet its inertia is so very great that a sudden and even very large disturbing force does not produce a quick movement. The analogous situation occurs with the disclosed vehicle in which the total weight of the structure is not large yet the principal masses are concentrated against the extreme ends of the frame the support of which is as near as is practically feasible to the center, so that sudden and even very large disturbing forces do not produce anything but a relatively slow swinging and changing of position of the vehicle frame and of course of the superposed body and contents. This arrangement has certain attributes also in connection with the application of power and the application of braking forces. In addition to the fact that the torque reaction of the differential and of the engine substantially cancel each other, so as not to be imposed unduly and unevenly upon the wheels, the center of gravity of the vehicle is ordinarily slightly above the transverse central axis of the vehicle extending through the frame, which relationship during deceleration ordinarily causes the frame to tend to rotate about its transverse axis so that the forward end dips and the rearward end rises, producing sometimes a very unpleasant and obnoxious forward pitching. In the present instance, however, the braking reaction of the forward pair of wheels 13 tends to rotate the supporting arms 23 and 24 so that the shaft 27 tends to lift the forward portion of the frame, whereas the braking reaction of the rearmost wheels 14 is such that the supporting arms 72 and 73 tend to lower the shaft 76, so that when the frame of the vehicle is looked at from the left-hand side, for example, the forces on the frame exerted through the shafts 27 and 76 tend to produce a clockwise moment which is opposed to the counter-clockwise moment about such axis of the decelerating force acting at the center of gravity against the ground, so that these forces substantially cancel each other for all normal braking applications, to reduce, if not entirely to eliminate, the tendency to forward pitching, and the frame therefore stays substantially level. This relationship applies not only during the braking or negative acceleration operation but applies equally when excessive frame pitching may threaten or occur when passing over extraordinarily unevenly spaced road bumps that synchronize with the frame periodicity when a slight pressure on the brake pedal causes the frame of the vehicle to stay substantially level with neither forward nor rearward pitching, so that the brakes act as auxiliary friction shock absorbers.

I prefer that the support members be located as close as possible to the frame connection of the wheel arm, in order to reduce movement of the diaphragms the range of which is kept within a very small compass, so that excessive movement downward by the frame or upward by the wheels is also resisted by the stresses on the material of the diaphragms and by compounding the resistance in the pneumatic devices to offset excessive movement between the wheels and the frame.

By reason of the arm mounting of the vehicle it is possible to get a shock-absorbing effect out of the brake structure as stated by an application of the brakes which act as friction shock absorbers to reduce pitching movement of the vehicle. That is to say, the pivotal movement between the supporting arms 23 and 24, for example, and the frame 6 about the axis of the shaft 27 is accompanied also by pivotal movement of the arms 23 and 24 about the rotational axis of a wheel 13. If the relative rotation between the wheel and the arms 23 and 24 is frictionally arrested, therefore, the relative movement between the frame and the arms 23 and 24 is likewise retarded, so that by applying the brake a frictional retardation slows the movement of the frame in a fore-and-aft pitching direction.

In addition to this function of the brakes, I can provide, if desired, a supplemental mechanism for reducing the pitching of the vehicle. This structure preferably includes an attachment to the forward part of the frame, preferably in duplicate, adjacent each of the forward wheels 13. Rotatably mounted in a pair of brackets 111 on the frame is a torsion bar 112 which at its rearward extremity has an outturned arm 113 connected by a link 114 to the arm 23, so that as the arm 23 rises and falls the bar 112 is rotated. The rotation of this bar is transmitted to an extending lever 116 operating between adjustable stops 117 and 118 threadedly engaged in an extension of the bracket 111. Preferably the adjustment of the stops 117 and 118 is so that there is an intermediate zone of free movement during which the rotation of the bar 112 is unresisted; but after the rotation of the bar exceeds the unrestricted zone, the end of the extension 116 contacts either the upper stop 117 or the lower stop 118, and a torsion of the bar 112 results. If desired, rubber pads can be utilized in the adjusting mechanism 117 and 118 to reduce the impact, but the general effect is to provide an auxiliary means which increases the resistance to movement of the supporting arms 23 and 24 as soon as a central free range of movement is exceeded. This movement is a relative one between the frame and the wheels, so that there is resisted either excessive movement of the wheels due to road irregularities, or excessive pitching of the vehicle frame. By the use of the various means of compounding resistance to the extremely flexible mounting of the sprung load upon the wheels, any amount of easy riding, coupled with road stability for different uses of a motor vehicle at different speeds and different load distribution, can be obtained.

I claim:

1. In a vehicle, a frame, supporting wheels for said frame, wheel supporting arms extending from the wheels toward the longitudinal center portion of the frame and journaled to the frame, brakes for said wheels, a plurality of pneumatic springs for transmitting loads between said frame and said wheels, means for adjustably positioning said pneumatic springs between said frame and said wheel supporting arms whereby to selectively adjust periodicity at the front and rear portions of the frame, said pneumatic means being interconnected for the interflow of fluid, and said supporting arms at their wheel supporting ends being connected to said brakes whereby when the brakes are applied the brake torque resists downward movement of the forward end of the frame.

2. In a vehicle, a frame, supporting wheels for said frame, wheel supporting arms extending from the wheels toward the longitudinal center portion of the frame and journaled to the frame, brakes for said wheels, opposed brackets carried by said arms and said frame and opposed elongated slots in said brackets, pneumatic springs supported between said opposed brackets to transmit loads between said frame and said arms and slidable in said slots to selective position whereby to adjust periodicity at the front and rear portions of the frame, said pneumatic springs being interconnected for the interflow of fluid, and said supporting arms at their wheel supporting ends being connected to said brakes whereby when the brakes are applied the brake torque resists downward movement of the forward end of the frame.

3. In a vehicle, a frame, supporting wheels for said frame, wheel supporting arms extending from the wheels toward the longitudinal center portion of the frame and journaled to the frame, brakes for said wheels, opposed brackets carried by said arms and said frame and having opposed elongated slots, spring devices supported between said opposed brackets to transmit loads between said frame and said arms and slidable in said slots to selective position whereby to adjust periodicity at the front and rear portions of the frame, said supporting arms at their wheel supporting ends being connected to said brakes whereby when the brakes are applied the brake torque resists downward movement of the forward end of the frame.

4. In a vehicle, a frame, supporting wheels for said frame, wheel supporting arms extending from the wheels toward the longitudinal center portion of the frame and journaled to the frame, brakes for said wheels, a plurality of pneumatic springs for transmitting loads between said frame and said wheels, said pneumatic springs being interconnected for the interflow of fluid, said supporting arms at their wheel supporting ends being connected to said brakes whereby when the brakes are applied the brake torque resists downward movement of the forward end of the frame, and means for resisting excessive interflow of fluid between said pneumatic springs comprising a torque rod extending longitudinally of the frame and connected at opposite ends thereof to the frame and a wheel supporting arm, respectively.

5. A vehicle comprising a frame, front and rear supporting wheels for said frame and brakes for said wheels, the center of gravity of said vehicle being above said frame whereby rotation of the vehicle and its frame about a transverse axis is induced when brakes are applied to the wheels, supporting arms for said front and rear wheels extending from the wheels toward the center longitudinal portion of the frame, one end of said arms being attached to the wheel brakes to thereby support the wheels and the opposite end being pivotally attached to the frame, the position of the front and rear wheel supporting arms relative to said transverse axis being such that when brakes are applied to the wheels opposed and substantially cancelling forces are exerted upon the front and rear ends of the frame whereby to prevent said rotation of the vehicle and frame.

6. A vehicle comprising a frame, front and rear supporting wheels for said frame and brakes for said wheels, the center of gravity of said vehicle being above said frame whereby rotation of the vehicle and its frame about a transverse axis is induced when brakes are applied to the wheels, supporting arms for said front and rear wheels extending from the wheels toward the center longitudinal portion of the frame, one end of said arms being attached to the wheel brakes to thereby support the wheels and the opposite end being pivotally attached to the frame, a plurality of pneumatic springs positioned between said frame and said wheel supporting arms for transmitting loads between said frame and said wheels, the position of the front and rear wheel supporting arms relative to said transverse axis being such that when brakes are applied to the wheels opposed and substantially cancelling forces are exerted upon the front and rear ends of the frame whereby to prevent said rotation of the vehicle and frame.

7. A vehicle comprising a frame, front and rear supporting wheels for said frame and brakes for said wheels, the center of gravity of said vehicle being above said frame whereby rotation of the vehicle and its frame about a transverse axis is induced when brakes are applied to the wheels, supporting arms for said front and rear wheels extending from the wheels toward the center longitudinal portion of the frame, one end of said arms being attached to the wheel brakes to thereby support the wheels and the opposite end being pivotally attached to the frame, a plurality of fluid interconnected pneumatic springs positioned between said frame and said supporting arms for transmitting loads between said frame and said wheels, the position of the front and rear wheel supporting arms relative to said transverse axis being such that when brakes are applied to the wheels opposed and substantially cancelling forces are exerted upon the front and rear ends of the frame whereby to prevent said rotation of the vehicle and frame.

8. In a vehicle frame having front and rear supporting wheels, brakes for said wheels and front and rear fluid interconnected springs for transmitting loads between said frame and said wheels, the said vehicle frame tending to rotate forwardly about a transverse axis when the brakes are applied, the combination of wheel supporting arms extending from the wheels toward the center longitudinal portion of the frame, the said arms being connected to the brakes at their wheel supporting ends and pivotally connected to the frame at their other ends whereby when the brakes are applied the brake torque is transmitted through said arms to the frame to resist rotation of the frame and prevent excessive flow of fluid from front to rear pneumatic springs.

9. A vehicle comprising a frame, front and rear supporting wheels for said frame and brakes for said wheels, the said vehicle and frame tending to rotate about a transverse axis when brakes are applied to the wheels, supporting arms for said front and rear wheels extending from the wheels toward the center longitudinal portion of the frame, one end of said arms being attached to the wheel brakes to thereby support the wheels and the opposite end being pivotally attached to the frame, a plurality of fluid interconnected pneumatic springs for transmitting loads between said frame and said wheels, the said pneumatic springs including diaphragms of variable effective area, and the position of the front and rear wheel supporting arms relative to said transverse axis being such that when brakes are applied to the wheels opposed and substantially cancelling forces are exerted upon the front and rear ends of the frame whereby to resist said rotation of the vehicle and frame.

10. In a vehicle, a frame, supporting wheels for said frame, wheel supporting arms extending from the wheels toward the longitudinal center portion of the frame and journaled to the frame, brakes for said wheels, a plurality of pneumatic springs for transmitting loads between said frame and said wheels, said pneumatic springs being interconnected for the interflow of fluid, said supporting arms at their wheel supporting ends being connected to said brakes whereby when the brakes are applied the brake torque resists downward movement of the forward end of the frame, and means restricting movement of a selected wheel relative to the frame thereby preventing excessive flow of fluid between said pneumatic springs.

11. In a vehicle, a frame, supporting wheels for said frame, wheel supporting arms extending from the wheels toward the longitudinal center portion of the frame and journaled to the frame, brakes for said wheels, a plurality of pneumatic springs for transmitting loads between said frame and said wheels, said pneumatic springs being interconnected for the interflow of fluid, said supporting arms at their wheel supporting ends being connected to said brakes whereby when the brakes are applied the brake torque resists downward movement of the forward end of the frame, and means for resisting excessive interflow of fluid between said pneumatic springs.

CHARLES A. HAWKINS.